United States Patent
Thies et al.

(10) Patent No.: US 9,416,734 B2
(45) Date of Patent: Aug. 16, 2016

(54) ACCESSORY MOUNTING FOR A GAS TURBINE

(71) Applicant: ROLLS-ROYCE DEUTSCHLAND LTD & CO KG, Blankenfelde-Mahlow (DE)

(72) Inventors: Robert Thies, Schweilowsee (DE); Carsten Buchholz, Berlin (DE); Andreas Staudte, Hoppegarten (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 788 days.

(21) Appl. No.: 13/713,933

(22) Filed: Dec. 13, 2012

(65) Prior Publication Data

US 2013/0160459 A1    Jun. 27, 2013

(30) Foreign Application Priority Data

Dec. 21, 2011  (GB) .................................. 1121971.4

(51) Int. Cl.
  *F02C 7/22*  (2006.01)
  *F02C 7/32*  (2006.01)
  *F02C 7/20*  (2006.01)

(52) U.S. Cl.
  CPC ... *F02C 7/32* (2013.01); *F02C 7/20* (2013.01); *Y02T 50/672* (2013.01); *Y10T 29/49236* (2015.01)

(58) Field of Classification Search
  CPC ............. B64D 27/26; B64D 2027/262; B64D 2041/002; F02C 7/32; F02C 7/20
  USPC .......................... 60/796, 797, 802; 244/54, 58
  See application file for complete search history.

(56) References Cited

U.S. PATENT DOCUMENTS

| | | | | |
|---|---|---|---|---|
| 2,978,209 A * | 4/1961 | Kerry | ..................... | B64D 27/18 244/130 |
| 4,055,041 A | 10/1977 | Adamson et al. | | |
| 4,428,189 A * | 1/1984 | Greenberg | ................ | F02C 7/20 244/54 |
| 4,458,863 A | 7/1984 | Smith | | |
| 4,875,655 A * | 10/1989 | Bender | ...................... | F02C 7/20 244/54 |
| 5,065,959 A * | 11/1991 | Bhatia | ..................... | B64D 27/14 244/54 |
| 6,039,287 A * | 3/2000 | Liston | .................... | B64D 29/00 244/120 |
| 6,170,252 B1 * | 1/2001 | Van Duyn | ............... | F01D 21/04 60/223 |
| 7,461,510 B1 * | 12/2008 | Munson, Jr. | ............ | F01D 15/10 60/796 |
| 7,516,621 B2 * | 4/2009 | Suttie | ......................... | F02C 7/32 248/639 |
| 8,167,237 B2 * | 5/2012 | Suciu | ..................... | B64D 27/26 244/54 |
| 8,256,707 B2 * | 9/2012 | Suciu | ......................... | F02C 7/20 244/54 |
| 8,607,578 B2 * | 12/2013 | Fert | ........................... | F02C 7/32 60/797 |
| 2010/0242496 A1 | 9/2010 | Cass et al. | | |

FOREIGN PATENT DOCUMENTS

EP     1 627 812 A2    2/2006

OTHER PUBLICATIONS

British Search Report issued in Application No. 1121971.4; Dated Apr. 19, 2012.

* cited by examiner

*Primary Examiner* — Charles Freay
(74) *Attorney, Agent, or Firm* — Oliff PLC

(57) ABSTRACT

Accessories are mounted to a gas turbine engine from a frame attached to a pylon which is used to mount the engine to an airframe. The frame independently mounts the accessories so that engine vibrations are not transmitted to the accessories.

13 Claims, 5 Drawing Sheets

ACCESSORY MOUNTING FOR A GAS TURBINE

TECHNICAL FIELD OF INVENTION

The present invention relates to mounting arrangements for accessories and particularly mounting arrangements for accessories in a gas turbine engine.

BACKGROUND OF INVENTION

FIG. 1 depicts an exploded view of the Trent 500 gas turbine engine showing the typical nacelle elements. The engine 56 without Nacelle is mounted to the aircraft fuselage or airframe via a pylon 14 which allows the thrust forces developed by the engine to be transmitted to the aircraft structure. The pylon 14 engages the engine 56 at a front mount 16 and a rear mount 18.

The gas turbine engine includes additional accessories, such as accessory gearboxes, accessories for gearboxes, dressings, cables, pipes, ducts, flowmeters, coolers, etc. Accessories may be driven or non-driven parts with or without fluids and with or without electrics. The accessories have significant weight and have to be mounted around the engine.

Conventionally the accessory gearboxes are mounted within the outer engine nacelle in a location beneath the engine. The gearbox is connected to the engine core via radial drive shaft. The gearbox provides power to other accessories such as an auxiliary generator or pumps for hydraulic, fuel or oil etc. systems. Other accessories are also driven by conventionally located gearboxes.

Although effective in that the gearbox is kept away from hot environment of the engine core the location of the gearbox within the outer nacelle is disadvantageous in that it requires a relatively significant amount of space within the nacelle which can increase the overall diameter of the nacelle, leading to weight and drag increase of and consequently to adverse specific fuel consumption In alternative arrangements it is possible to locate the accessories directly to the engine core. The accessories are directly attached by brackets, short links or bosses but Inertia, vibration and thermal loads in the engine core can be transferred to the brackets or accessories and can cause premature failure or reduced reliability of those components.

It is an object of the invention to seek to provide an improved accessory mounting arrangement.

STATEMENTS OF INVENTION

According to a first aspect of the invention there is provided an engine for an aircraft having a frame supporting at least one accessory, wherein the frame provides a direct load path between the accessory and front and rear mount points for the engine.

Advantageously the direct load path does not pass through the engine so that vibrations from the engine do not pass directly to the one or more accessories mounted to the frame.

Advantageously the frame uses the engine mount points which mount the engine to a pylon structure. An integral mounting plate may be provided to interface between the pylon structure the frame.

Preferably anti-vibration mounts for damping vibration are provided between the frame and the front and/or rear mount.

The frame may be connected to just one of either the front mount region or the rear mount region.

Preferably the frame comprises at least one jointed strut for absorbing axial movement of the frame relative to the front and rear mount points. The frame may be curved and arranged with the curve extending coaxially with the axis of the engine. A plurality of curved frame elements may be provided which are bolted or welded to form a ring.

The frame may be provided from a plurality of frame elements which may be symmetrically or asymmetrically arranged about the engine axis.

A fail safe link may be provided between the rear engine structure and the rear mounting plate and may provide an attachment lug for the frame.

According to a second aspect of the invention there is provided a method of assembling an accessory to an engine assembly, the method comprising the steps of mounting the accessory to a frame and mounting the frame with the pre-mounted accessory to the engine at front and rear mount points of the engine.

The accessories may be located within an inner nacelle line of the engine.

According to a third aspect of the invention there is provided a gas turbine engine assembly having a pylon for mounting the engine to an aircraft, the assembly characterised in that a frame supporting at least one accessory independently of the engine is attached to the pylon at forward and rearward mountings.

By supporting the, or each, of the accessories independently of the engine resonant frequencies of the engine can be damped to have a reduced effect on the accessory. Independently mounted means that the weight of the, or each, accessory and other dressings is not supported by the engine. However, supports may optionally extend between the accessory and the engine but there is minimal or no mounting load transfer through these supports.

Beneficially, the frame permits the accessory to be located close to the engine core but not be mounted to it in such a way that significant temperature or vibrations are transferred. Accessories that may be mounted include, but are not limited to, an accessory gearbox, pumps, cables, pipes, heat shields, which can improve local cooling effects, and sensors.

Significant direct shocks on the engine core can occasionally occur due to blade release. The frame can minimise the transfer of these loads to the mounted accessories.

The use of a frame, although adding weight to the overall engine, can beneficially result in a net weight reduction as it is possible to locate the accessories closer to their point of use or more efficiently or evenly about the engine. This can reduce the length of brackets, links, bosses or other connections which mount the accessories as well as any drive trains. The frame may be manufactured from hollow or lightweight tubes to reduce the mass added to the engine assembly. The frame may be used to route or guide dressings such as pipes or cables; where a hollow frame is used the pipes may be embedded within the frame. The frame may be aerodynamically shaped as an aerofoil to minimise or positively affect the ventilation flow within the inner nacelle.

Advantageously, the engine cases can be designed to be lighter as loads applied from the units gearboxes and dressings are minimised Preferably the frame comprises a front support and a rear support. The front support having two struts passing either side of the engine. The two front struts are preferably symmetrically arranged to balance the frame to the pylon. The struts may be connected to the pylon at respective mounting points.

Preferably the frame comprises a front support and a rear support the rear support having two struts passing either side of the engine. The two rear struts are preferably symmetrically arranged to balance the frame to the pylon. The struts may be connected to the pylon at respective mounting points.

The frame may comprise a hoop arranged coaxially with the axis of the engine. The hoop may be provided by a plurality of joined curved elements. The frame may be welded or bolted to other elements of the frame.

Advantageously the front and rear supports on each side may be connected together either directly or through one of the mounted accessories. The supports can be arranged to stiffen the engine arrangement which can have the beneficial effect of limiting casing movement and improving both tip clearance and efficiency.

Accessories may be mounted to the front, rear or both supports as required.

Preferably the frame is mounted to the pylon through one or more anti-vibration mounts. The anti-vibration mounts can be used to adjust the transfer of the resonant frequency of the engine to the accessory.

Anti-vibration mounts may be used not just at the end of the support by the pylon but also between the support and the accessory. Beneficially, this permits the vibrations to the accessories to be further controlled even, for some applications, on an accessory by accessory basis. This advantageous control further reduces the possibility of accessory failure due to vibration fatigue.

The engine assembly preferably has an inner nacelle separating the engine core from a bypass duct. The accessories are preferably positioned within the inner nacelle line i.e. between the inner nacelle and the engine core. The space within the inner nacelle line can be crowded and the frame increases the options available to utilise this space for accessories. Due to the modular aspect of the frame, the overall dressings design can be simplified and can give an improved potential for reduced build time through pre-assembly of the accessories to the frame.

According to a fourth aspect of the invention there is provided an accessory mounting arrangement for a gas turbine comprising a pylon for mounting a gas turbine to an airframe and an accessory gearbox, characterised in that the accessory gearbox is connected to the pylon by a front support and a rear support. Accessories other than the accessory gearbox may also be attached to the pylon by a front support and a rear support.

Preferably the front support and/or the rear support have spaced apart struts which depend either side of an engine mounted to the pylon. Each of the front and/or rear supports may be connected to the pylon through an anti-vibration mount which will reduce the transfer of vibration loads to the accessories.

Where appropriate and possible the features of each aspect of the invention may be used with, or in replacement of, features of the other aspects.

The invention will now be described by way of example only and by reference to the accompanying drawings in which:

DETAILED DESCRIPTION OF INVENTION

Figure 1:
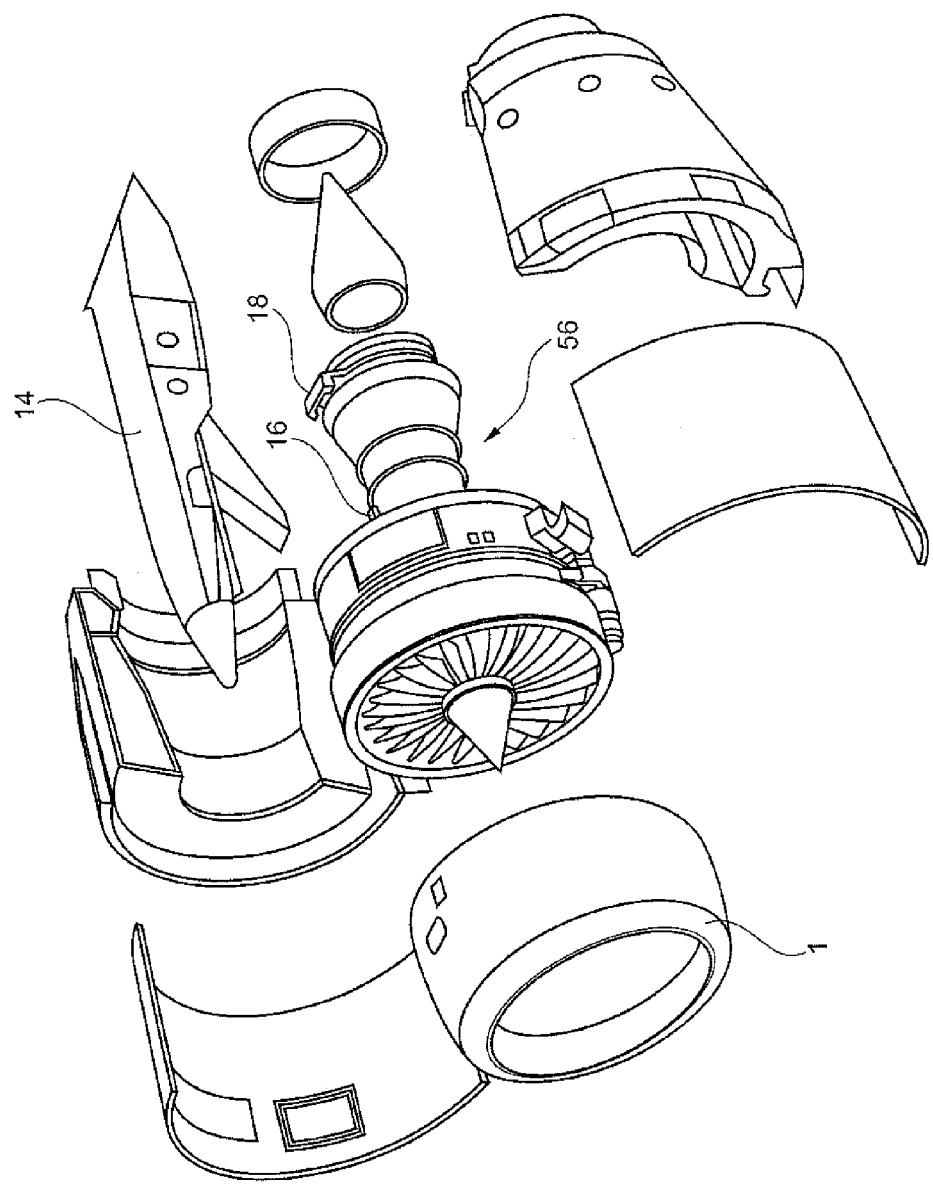
FIG. 1 depicts an exploded view of a gas turbine engine showing typical nacelle elements.
Figure 2:
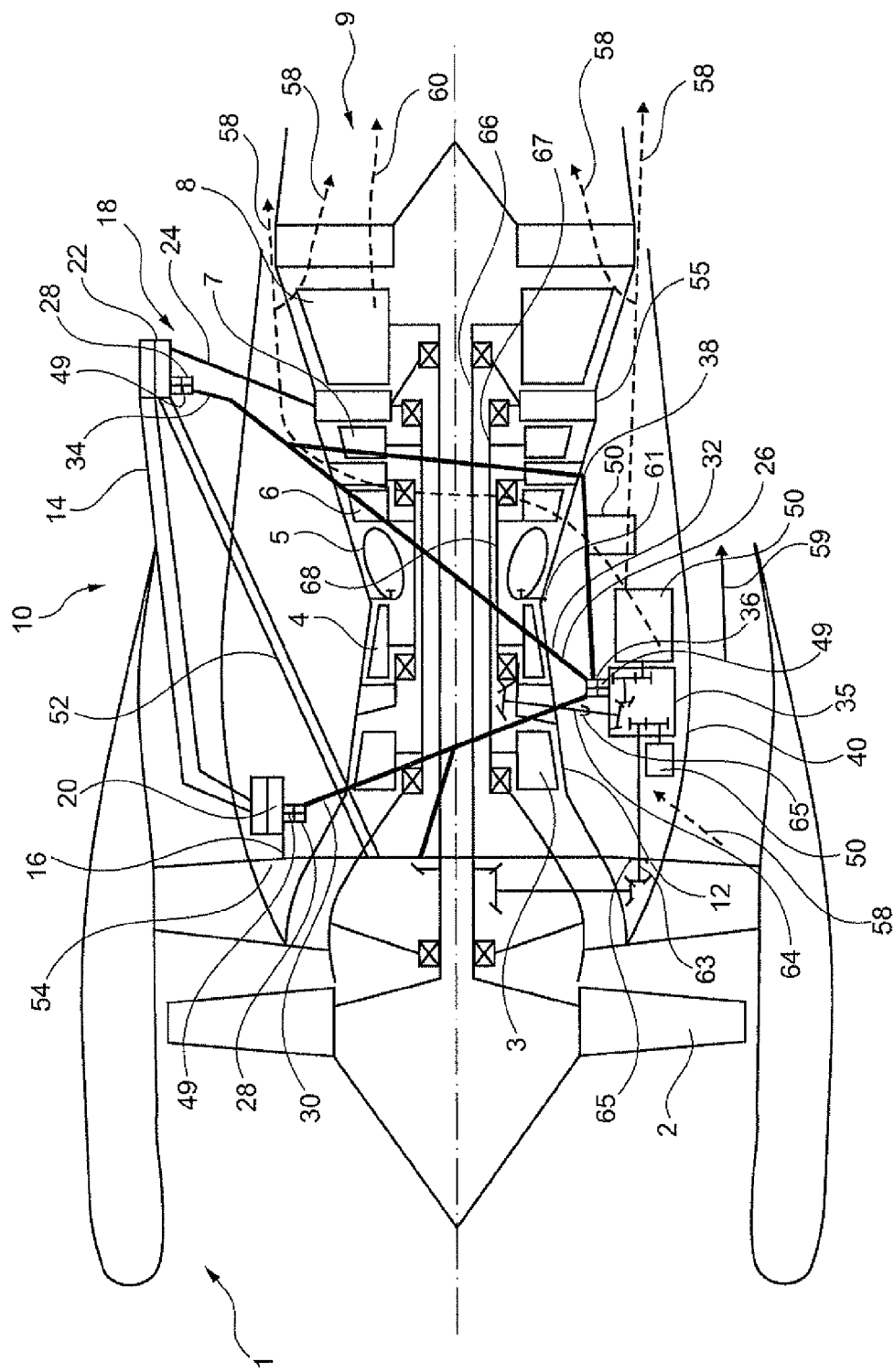
FIG. 2 depicts an exemplary gas turbine engine with an accessory mounting frame.

FIG. 2 depicts a cross-section of ducted fan gas turbine engine generally indicated at 10 which comprises, in axial flow series, an air intake 1, a propulsive fan 2, an intermediate pressure compressor 3, a high pressure compressor 4, combustion equipment 5, a high pressure turbine 6, an intermediate pressure turbine 7, a low pressure turbine 8 and an exhaust nozzle 9.

Air entering the air intake 1 is accelerated by the fan 2 to produce two air flows, a first air flow into the intermediate pressure compressor 3 and a second air flow 59 that passes over the outer surface of the engine casing 12 and which provides propulsive thrust. The intermediate pressure compressor 3 compresses the air flow directed into it before delivering the air to the high pressure compressor 4 where further compression takes place.

Compressed air exhausted from the high pressure compressor 4 is directed into the combustion equipment 5, where it is mixed with fuel that is injected from a fuel injector 61 and the mixture combusted. The resultant hot combustion products expand through and thereby drive the high 6, intermediate 7 and low pressure 8 turbines before this flow is being exhausted as core stream 60 through the nozzle 9 to provide additional propulsive thrust. The high, intermediate and low pressure turbines respectively drive the high and intermediate pressure compressors and the fan by suitable interconnecting shafts: High Pressure Shaft 68, Intermediate Pressure Shaft 67 and Low Pressure Shaft 66.

A flow 58 for cooling the accessories enters the accessory mounting zone by an opening at the front of the inner Nacelle line 40 and mixes with the bypass-air at the rear of the inner Nacelle line or mixes with the core flow 60 at the rear of the engine close to the nozzle 9.

The engine is mounted to the aircraft structure via a pylon 14 which locates on the engine at a front mount 16 and a rear mount 18. The mounts carry the weight of the engine and transfer thrust loads from the engine through the pylon to the aircraft structure. The front of the pylon is attached to the front mount 16 on the front frame 54 or alternatively to the fan casing through a front attachment bracket 20 which is integral with or bolted to the pylon 14. The rear of the pylon is mounted to the rear engine mount 18 through a rear attachment plate 22 and an engine link 24 which permits axial movement of the engine relative to the rear attachment bracket 22.

Also attached to the pylon is an accessory mounting frame 26 which is secured to the front attachment and rear attachment brackets by mounts 28, which may be anti-vibration mounts 49. The frame 26 of FIG. 2 has a front struts 30 that extends from the front attachment bracket 20 and joins to a rear strut 32 that extends from the rear attachment bracket 22. It will be appreciated that the arrangement of struts passes to one side of the engine core and that a corresponding arrangement of struts is provided on the opposite side of the core. Although the struts 30, 32 are shown as being straight it may be necessary to use curved struts that bow around the engine core.

Each rear strut may be attached to the rear attachment bracket through a swing link 34 which permits axial movement of the rear strut as required by, for example, thermal growth.

The front and rear struts together form a "V" arrangement and join at an accessory 35, in this case the accessory gearbox.

The front and rear struts are mounted to the accessory gearbox by one or more hinge mounts 36.

The accessory gearbox can be driven by an axial drive train, e.g. from the low speed drive train 63 which is driven by the low pressure shaft 66. The accessory gearbox can be further driven by a radial drive train e.g. by the high speed drive train 64 which is driven by the high pressure shaft 68.

These drive trains have preferably one ore more interconnections or couplings (e.g. spline connections) 65 to withstand movement of the gearbox 35.

In the example of FIG. 2 the rear strut has additional frame section 38 mounted to it. The additional frame section advantageously provides additional locations for mounting of further accessories 50. The shape of the additional frame section may be selected so that the further accessories can be optimally located in order to reduce the length of any mounting brackets, drive trains or circuitry to the further accessories or to ensure all the accessories can fit within the inner nacelle line 40, which can be a congested volume. Exemplary accessories which may be mounted are generators e.g. starter generators, pumps, gearboxes, brackets, cables, sensors, and wiring. The location of the components may be selected to provide good access for maintenance and a good cooling flow 58 or air around each accessory.

The mounts 28, 36 are preferably anti vibration mounts which can beneficially decouple the accessories from the core engine vibrations. The mounts can be selected to further reduce the vibration responds of the frame and finally the vibration input to the accessories. The corresponding vibration loads could, if not damped, lead to foot-point excitation of an accessory bracket and early failure of the bracket or accessory.

Engine thrust links 52 (preferable one left of the engine and one right from the engine) are located between the rear attachment bracket 22 and the front structure 54. No accessories are mounted to these links.

Figure 3:
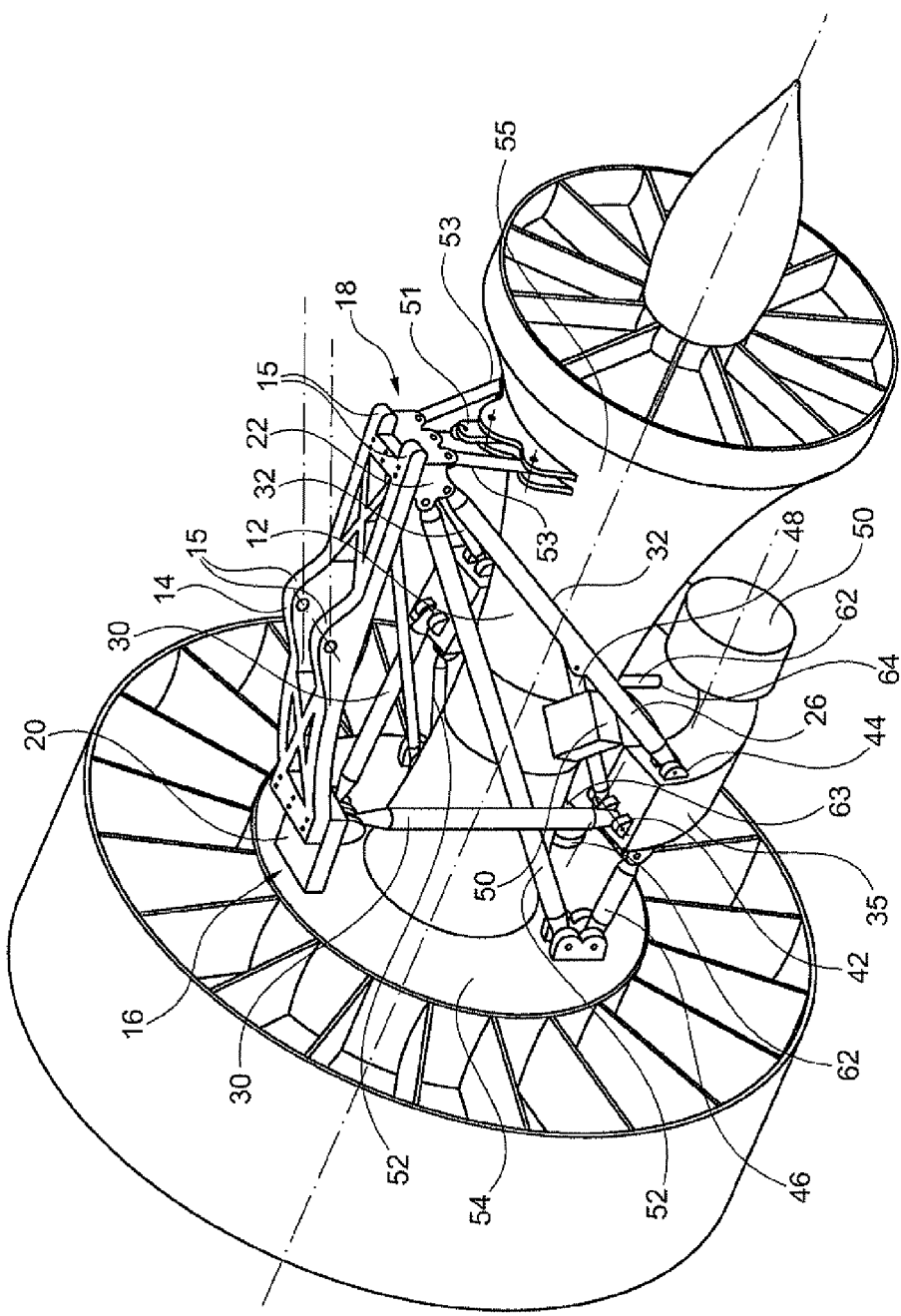
FIG. 3 is a perspective view of an alternative exemplary gas turbine engine with an accessory mounting frame.

An alternative embodiment is shown in FIG. 3. Where possible the same numerals have been used to identify similar parts with the embodiment of FIG. 2. It will be appreciated that although these embodiments are separate it may be possible to combine features of one embodiment with features of the other embodiments.

FIG. 3 depicts a gas turbine engine with the inner nacelle removed. The engine is mounted to the airframe via a pylon 14 that is mounted to the main aircraft structure through lugs 15 at the midpoint and aft end of the pylon. The pylon has a front mounting bracket 20 which attached to the front structure 54 at a front mount 16 and a rear mounting bracket 22 attached to a rear mount 18 on the turbine casing or engine rear structure 55 via links 53 at the rear of the engine. The pylon is positioned at the top of the engine and struts 30, 32 extend down from the pylon to form a frame 26 for mounting accessories. Two front struts 30 are provided, one for each side of the engine core. These struts are substantially vertical and diverge from the pylon and are mounted to respective lugs 42 on the accessory gearbox, one lug on each side of the engine core. Two rear struts 32 are provided, one for each side of the engine core. These struts are angled forwards and diverge from the pylon and are mounted to respective rear lugs 44 on the accessory gearbox, one lug on each side of the engine core.

In this arrangement of struts the accessory gearbox is securely mounted to the pylon but an optional axial link 46 may be provided between the front structure 54 and the accessory gearbox 35 to reduce unwanted axial movement of the accessory gearbox. Further accessories and dressings 50 may be mounted off the accessory gearbox or the frame directly.

A further support strut 48 may be provided between the front strut and the rear strut onto which additional accessories 50 may be mounted.

In the embodiment of FIG. 3 an engine thrust link 52 is located between the rear attachment bracket and the front structure 54. No accessories are mounted to this link.

Anti vibration mounts 49 can be used between the front struts and the front attachment brackets and between the rear struts and the rear attachment brackets. The vibration mounts permit the engine loads or eigenfrequency behaviours of the engine and engine casing structure to be decoupled from the accessory units. Beneficially, the effects of whole engine vibration need not be considered to a high extent for the environment of the accessories.

Applied vibration effects of the frame can be adjusted by the shape of the frame and the attachment points to the pylon. The anti-vibration mounts 49, where used, have a different damping characteristic to the rest of the frame and may be made from softer materials such as high temperature elastomeric or composite metal assemblies with implemented spring effects.

The attachment points at the rear of the frame can include swing links which mitigate the effects of thermal expansion of the engine casing or other components.

The accessory gearbox is driven by the low speed drive train 63 and/or driven by a high speed drive train 64.

Both drive trains should be covered by covers 62 for protection purpose and to avoid oil- and heat contamination between the drive trains and adjacent hardware (e.g accessories 50).

Figure 4:
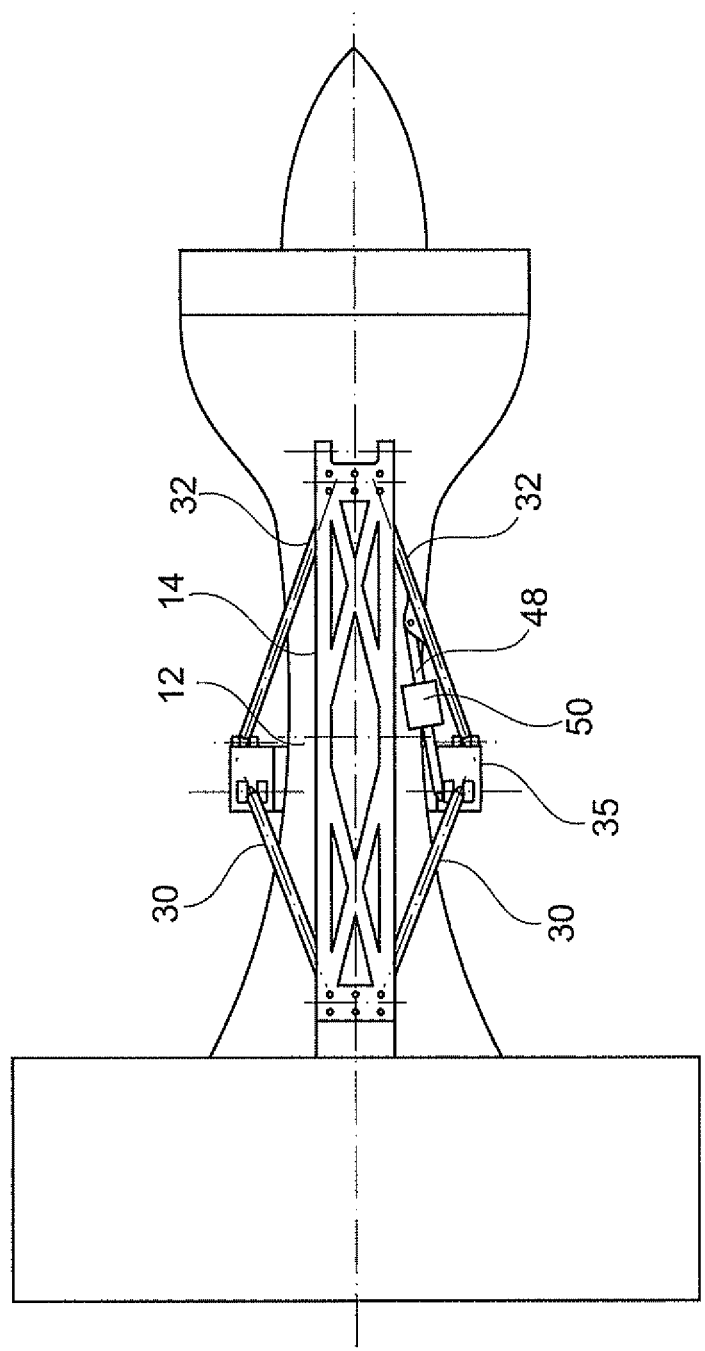
FIG. 4 depicts a top view of the embodiment of FIG. 3.

FIG. 4 is a simplified top view of the embodiment of FIG. 3. Some details shown in FIG. 3, such as the thrust struts 52, are omitted for clarity.

The accessory gearbox 35 is joined to the pylon 14, in between the engine casings 12, by symmetrically arranged front struts 30 and symmetrically arranged rear struts 32. The front and rear struts diverge from the pylon with the spacing at the distal ends being determined by the size of the accessory 35. It will be appreciated that this spacing may be provided by a spacing strut to which the accessory may be mounted. In this arrangement the front and rear struts may not be directly attached to the accessory 35. A main accessory support structures 48 are attached to these struts to further stiffen up the whole structure and provide preferred attachment place for further accessories 50.

Figure 5:
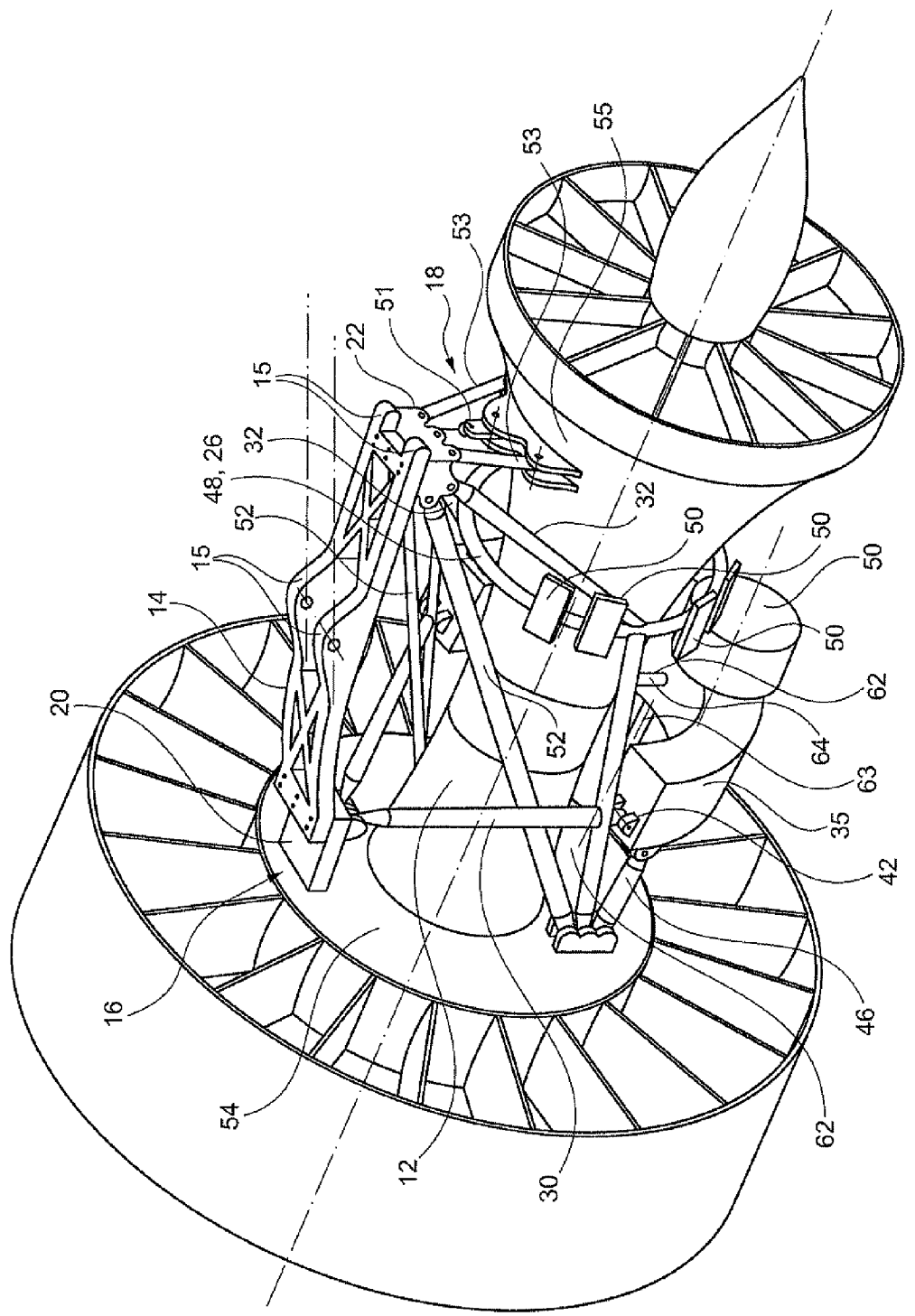
FIG. 5 depicts a perspective view of an alternative exemplary gas turbine with an accessory mounting frame.

FIG. 5 depicts an alternative embodiment, where the same reference numerals are used for the same components of the previous embodiments. The engine assembly is provided with a hooped accessory support structure 48 which is coaxially arranged with the engine axis. The support structure may be provided as separate elements which are either hinged, bolted, welded or otherwise secured together so that it can be assembled around the engine.

The accessory support structure has the primary function of carrying a number of accessories other than the main accessory gear box. Beneficially by mounting accessories 50 in this way it is possible to isolate the accessories attached to the support structure 48 from vibrations and loads from both the gearbox and the engine.

One of the many advantages of using a support frame or structure is that it can be removed from the engine assembly without having to remove the engine from the pylon structure. Accessories 50 may be pre-mounted to the frame or support structure prior to the frame being mounted to the front and/or rear mounts. This is advantageous as it can speed up repair and replacement of accessories.

The engine is mounted to the pylon structure by engine rear mount attachment struts 53. A fail safe swing link 51 further connects the engine via the rear attachment bracket 22 to the pylon to prevent the engine becoming detached from the pylon should the engine rear mount attachment struts fail for any reason.

Optionally the frame maybe used to stiffen the engine main structure. However the vibration isolation effect described before may be affected, the rotor tip clearance will be improved and the material thickness of the engine casings 12 can be reduced in thickness.

DRAWING REFERENCES

| Ref. No. | Description |
| --- | --- |
| 1 | Air Intake |
| 2 | Propulsive fan |
| 3 | Intermediate compressor |
| 4 | High pressure compressor |
| 5 | Combustion Equipment |
| 6 | High Pressure turbine |
| 7 | Intermediate pressure turbine |
| 8 | Low pressure turbine |
| 9 | Exhaust nozzle |
| 10 | Gas turbine engine |
| 12 | Engine casing |
| 14 | Pylon structure |
| 15 | Pylon lugs |
| 16 | Front mount |
| 18 | Fail safe rear mount |
| 20 | Front attachment bracket |
| 22 | Rear attachment bracket |
| 24 | Engine link |
| 26 | Accessory mounting frame |
| 28 | Accessory mounting frame mounts |
| 30 | Front strut |
| 32 | Rear strut |
| 34 | Swing link |
| 35 | Accessory or Accessory Gearbox |
| 36 | Hinge mount |
| 38 | Additional frame section |
| 40 | Inner nacelle line |
| 42 | Forward on accessory gearbox |
| 44 | Rearward lug on accessory gearbox |
| 46 | Optional axial link |
| 48 | Main accessory support structure |
| 49 | Anti vibration mount |
| 50 | Accessory or Unit |
| 51 | Fail save swing link |
| 52 | Thrust strut |
| 53 | Engine rear mount attachment strut |
| 54 | Engine front structure |
| 55 | Engine rear structure |
| 56 | Engine with nacelle disassembled |
| 58 | Fan cooling flow |
| 59 | Fan bypass stream |
| 60 | Core exhaust stream |
| 61 | Fuel Injector |
| 62 | Cover for drive train |
| 63 | Low speed axial drive train |
| 64 | High speed radial drive train |
| 65 | Accessory gearbox drive shaft coupling |
| 66 | Low pressure shaft |
| 67 | Intermediate pressure shaft |
| 68 | High pressure shaft |

The invention claimed is:

1. An engine assembly for an aircraft, comprising:
   an engine having a front mounting location for mounting the engine to the aircraft; and
   a frame supporting at least one accessory, the frame having a pair of forward struts, each strut of the pair of forward struts having a first end adjacent the front mounting location and a second end remote from the front mounting location, each strut within the pair of forward struts passing the engine on opposing sides,
   wherein the at least one accessory is mounted at the second end of the pair of forward struts, the pair of forward struts providing a direct load path between the accessory and the front mounting location of the engine.

2. The engine assembly according to claim 1, wherein anti-vibration mounts for damping vibration are provided between the frame and the front mounting location.

3. The engine assembly according to claim 1, wherein anti-vibration mounts for damping vibration are provided between the frame and the at least one accessory.

4. The engine assembly according to claim 1, wherein the frame comprises at least one jointed strut for providing axial movement for compensation of thermal expansion.

5. The engine assembly according to claim 1, wherein an integral mounting plate is provided to interface between a pylon structure and the frame.

6. The engine assembly according to claim 1, further comprising an inner nacelle separating an engine core from a bypass duct, wherein the at least one accessory is positioned within a line of the inner nacelle.

7. The engine assembly according to claim 1, wherein the at least one accessory is an accessory gearbox carried beneath the engine and mounted at a first end to a first one of the pair of struts and mounted at a second end to a second one of the pair of struts.

8. The engine assembly according to claim 1, wherein the engine has a rear mounting location axially spaced from the front mounting location, the engine assembly further comprising:
   a pair of rearward frame struts, each strut within the pair of rearward frame struts having a first end adjacent the rear mounting location and a second end remote from the mounting location, each strut within the pair of rearward frame struts passing the engine on opposite sides.

9. The engine assembly according to claim 8, wherein the frame comprises a ring structure mounted to the rearward frame struts, the ring structure extending around the engine and being coaxial therewith.

10. The engine assembly according to claim 9, wherein the ring structure is provided by a plurality of curved segments welded or bolted together.

11. The engine assembly according to claim 8, wherein the second end of each strut of the pair of rearward frame struts is connected to a respective strut of the pair of forward frame struts.

12. A gas turbine engine assembly connected to a pylon structure for mounting the engine to an aircraft, the gas turbine assembly comprising:
   a frame supporting at least one accessory independently of the engine, the frame being attached to the pylon at forward and rearward engine mounting locations; the frame having a pair of forward struts extending from the forward mounting location, each forward strut within the pair passing the engine on opposing sides; the frame having a pair of rearward struts extending from the rearward mounting location, each rearward strut within the pair passing the engine on opposing sides.

13. The gas turbine engine assembly according to claim 12, wherein the frame, the forward struts, or the rearward struts route dressings selected from the group comprising pipes and/or cables.

\* \* \* \* \*